US011352539B2

(12) United States Patent
Scalley

(10) Patent No.: US 11,352,539 B2
(45) Date of Patent: Jun. 7, 2022

(54) BASE OIL FOR RE-USE

(71) Applicant: RECOVER ENERGY SERVICES INC., Calgary (CA)

(72) Inventor: Matthew Scalley, Calgary (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 168 days.

(21) Appl. No.: 15/981,587

(22) Filed: May 16, 2018

(65) Prior Publication Data

US 2018/0334606 A1    Nov. 22, 2018

Related U.S. Application Data

(60) Provisional application No. 62/506,851, filed on May 16, 2017.

(51) Int. Cl.
| | | |
|---|---|---|
| *C09K 8/34* | (2006.01) | |
| *E21B 21/06* | (2006.01) | |
| *E21B 21/00* | (2006.01) | |

(52) U.S. Cl.
CPC .............. *C09K 8/34* (2013.01); *E21B 21/062* (2013.01); *E21B 21/065* (2013.01); *E21B 21/067* (2013.01); *E21B 21/068* (2013.01); *E21B 21/003* (2013.01); *E21B 21/066* (2013.01)

(58) Field of Classification Search
CPC ....................................................... B09C 1/00
See application file for complete search history.

(56) References Cited

U.S. PATENT DOCUMENTS

| | | | | |
|---|---|---|---|---|
| 4,606,774 | A * | 8/1986 | Morris | ...................... B09C 1/02 |
| | | | | 134/10 |
| 4,836,302 | A * | 6/1989 | Heilhecker | .......... B01D 11/028 |
| | | | | 175/66 |
| 5,189,012 | A | 2/1993 | Patel et al. | |
| 7,547,663 | B2 | 6/2009 | Kirsner et al. | |
| 2005/0236015 | A1 * | 10/2005 | Goel | ..................... E21B 21/066 |
| | | | | 134/10 |

FOREIGN PATENT DOCUMENTS

| | | |
|---|---|---|
| CA | 2712774 | 11/2010 |
| CA | 2793233 | 12/2013 |
| CA | 2741955 | 5/2015 |

* cited by examiner

*Primary Examiner* — Angela M DiTrani Leff
*Assistant Examiner* — Avi T Skaist
(74) *Attorney, Agent, or Firm* — Greenblum & Bernstein, P.L.C.

(57) ABSTRACT

A process for producing a base oil composition particularly adapted for use in oil-base drilling mud compositions. The process includes contacting drilling waste containing an oil-base mud phase with a solvent to produce a mixture of liquids and solids, separating the two phases, partially evaporating the liquids phase to produce an oil base composition substantially lacking low molecular weight carbon chain compounds and also lacking significant concentrations of benzene, toluene, xylene, and/or ethyl benzene, and having increased closed-cup flashpoint when compared to the oil-base mud phase in the drilling waste. The resulting base oil has enhanced health and safety characteristics for workers interacting with and otherwise exposed to the oil base composition during transporting, conditioning or using such compositions. The base oil produced and drilling methods using the recovered and recycled mud are also described.

6 Claims, 5 Drawing Sheets

BASE OIL FOR RE-USE

CROSS-REFERENCE TO RELATED APPLICATION

This application is a Non-Provisional Application claiming the benefit under 35 U.S.C. § 119(e) of U.S. Provisional Application No. 62/506,851 filed May 16, 2017, the disclosure of which is expressly incorporated by reference in its entirety.

TECHNICAL FIELD

The field of art to which this invention generally pertains is drilling fluids, and specifically oil-base drilling fluids.

BACKGROUND

During the drilling of a well, for example, for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid.

The earliest drilling muds were water base, and, in their simplest form were drill cuttings hydrated with water. As drilling technologies have developed, so have the demands placed on drilling fluids. Several major factors have influenced the development of modern drilling muds, including directional drilling, and production of shale plays.

Oil base muds (OBMs or 'Invert') are now often used to drill oil and gas wells because they have special improved characteristics over other aqueous drilling muds. One of the main advantages of OBMs (as compared to aqueous based muds) is that they address the issue of shale stability. Water base muds can react badly with formation clays and shales, causing them to swell and increase the viscosity of the drilling fluid. This can lead to higher torque on the drill bit, and increase the risk of a drill bit becoming stuck. OBMs largely overcome this issue, which is particularly beneficial as the push toward tight shale based plays and other shale type formations increase in popularity.

Today's drilling muds are required to achieve many functions dependent on many different factors, but broadly classified as:

i. Pressure Control—Required to prevent well blowouts. A blowout occurs when the drilling operation encounters a formation loaded with high pressure gas or liquid which ultimately reaches the surface. A heavy column of drilling fluid serves to prevent migration of formation fluids into the well bore, thereby protecting surface workers. Weighting agents are typically added to the mud to achieve sufficient hydrostatic pressure control, e.g., Barite ($BaSO_4$).

ii. Cuttings Retrieval—Shales, clays and formation debris continually slough off the walls of the well bore and into the drilling fluid. These "cuttings" hinder drilling fluid performance if allowed to accumulate. The accumulation of Low Gravity Solids (LGS) in an active drilling mud system is of significant concern to drilling well operators because they contribute to increased wear of high volume circulating equipment, they can cause the drill string to become differentially stuck in porous formations leading to expensive drilling downtime, and they contribute to reduced rates of drilling penetration, commonly known by those in the industry as the Rate of Penetration (ROP). LGS are continuously removed from the drilling operation by first carrying them to the surface in the mud, followed by removal at the surface. In order to carry the cuttings to the surface using drilling mud, the rheological properties of the drilling fluid are controlled to provide sufficient viscosity and yield strength. Typically, polymer additives are also used to alter the drilling fluid carrying properties. Additives are also used to provide sufficient 'gel strength' such that if the drilling operation has to stop, the mud can still hold cuttings in suspension for a reasonable period of time.

iii. Fluid Loss Control—Drilling fluid losses occur through the walls of the well bore to the formation. These, and other losses, need to be made up for by adding more 'fresh' mud at the surface. Every effort is made to reduce drilling fluid losses, especially to the formation. The ideal drilling fluid forms a thin impermeable cake around the walls of the well, but is easily removed when required. Once the cake forms, it isolates the formation from the drilling fluid, thereby eliminating fluid losses to the formation.

iv. Shale Stability—Water base drilling fluids can interact with shales in a negative way. They can cause shales to swell and become sticky and viscous, causing well bore instability, increased drill torque, and a host of other problems. Oil base muds (OBM's) largely addressed this issue which has helped OBM's gain traction as the preferred base for most modern-day drilling fluids.

v. Bit Lubricity—The drilling mud should simultaneously lubricate and cool the bit.

While oil base muds are not particularly hazardous, they have been known to cause short and/or long term adverse health effects, including but not limited to:

Dermatitis; an irritating skin rash caused primarily by the more aromatic $C_6$ and $C_8$-$C_{14}$ paraffinic components. It is caused by repeated chronic skin contact.

Cancer; caused by long term skin and lung exposure. BTEX (benzene, toluene, ethylbenzene and xylene), and in particular, benzene, are recognized as some of the most carcinogenic of compounds. They are relatively volatile in invert muds and so make up a disproportionately higher volume in any drilling fluid vapors.

Benzene misting is a phenomenon whereby tiny liquid droplets form near the liquid surface of a drilling fluid. This can occur at any process areas where the drilling fluid is open to atmosphere, and when the fluid is agitated, for example near shale shakers, centrifuge discharges, tops of mud tanks etc. Absorption of BTEX by inhalation and skin contact is more likely at these locations, and therefore extra care is taken to minimize contact.

All OBM's are combustible and will burn with a large energy release if ignited. As such, all OBM's are regarded as potentially combustible.

As ever more additives and base oil technology are developed to satisfy the increasing demands of modern drilling operations, so the cost of producing, operating, and disposing of drilling fluids continues to climb.

BRIEF SUMMARY

A process for producing a base oil composition particularly adapted for use in oil-base drilling mud compositions is described including contacting drilling waste containing an oil phase with a solvent to produce a mixture containing liquids and solids, separating the two phases, processing the liquids phase to produce an oil base composition substantially lacking low molecular weight carbon chain compounds and substantially lacking significant concentrations of benzene, toluene, xylene, and/or ethyl benzene, and having increased closed-cup flashpoint compared to the oil phase, resulting in enhanced health and safety characteristics for workers interacting with and otherwise exposed to the oil base composition during transporting, conditioning or using such compositions.

Additional embodiments include: the process described above carried out in a gas-tight, substantially oxygen deficient environment; the process described above where the drilling waste is from one or more drilling waste generators; the process described above where the drilling waste is contaminated with at least a portion of oil base drilling fluid; the process described above where contacting comprises washing the drilling waste with a solvent containing up to nine carbon atoms in each solvent molecule; the process described above including using less than 4,000 MJ of combined electrical and combustion gas energy per cubic metre of produced base oil; the process described above where the produced base oil has a closed cup flash point of greater than 61° C.; the process described above where the produced base oil has a closed cup flash point of greater than 93° C.; the process described above where the produced base oil has a closed cup flash point of greater than 100° C.; the process described above where the produced base oil has a combined total benzene, toluene, xylene, and ethyl benzene content of less than 0.0005 volume fraction; the process described above where the produced base oil has a combined total benzene, toluene, xylene, and ethyl benzene content of less than 0.00005 volume fraction; the process described above where the produced base oil comprises an aniline point of greater than 65° C.; the process described above where the produced base oil comprises an aniline point of greater than 70° C.; the process described above where the produced base oil contains at least 90.00% by volume of $C_{11}$ to $C_{25}$ molecules; the process described above where the produced base oil contains at least 90.00% by volume of $C_{14}$ to $C_{25}$ molecules; the process described above where the produced base oil contains at least 90.00% by volume of $C_{14}$ to $C_{23}$ molecules; the process described above where the produced base oil contains less than 1.00% by volume of $C_{11}$ or fewer carbon atoms per molecule; the process described above where the produced base oil contains less than 5.00% by volume of $C_{25}$ or more carbon atoms per molecule; and the process described above where the produced base oil has a mass density of less than 850 kg/m$^3$ at 15° C.

Additional embodiments include: the base oil produced by the process described above; the base oil described above where the oil has a closed cup flash point of greater than 61° C.; the base oil described above where the produced base oil has a closed cup flash point of greater than 93° C.; the base oil described above where the produced base oil has a closed cup flash point of greater than 100° C.; the base oil described above where the produced base oil has a combined total benzene, toluene, xylene, and ethyl benzene content of less than 0.0005 volume fraction; the base oil described above where the produced base oil has a combined total benzene, toluene, xylene, and ethyl benzene content of less than 0.00005 volume fraction; the base oil described above where the oil has an aniline point of greater than 65° C.; the base oil described above where the oil has an aniline point of greater than 70° C.; the base oil described above where the oil contains at least 90.00% by volume of $C_{11}$ to $C_{25}$ molecules; the base oil described above where the oil contains at least 90.00% by volume of $C_{14}$ to $C_{25}$ molecules; the base oil described above where the oil contains at least 90.00% by volume of $C_{14}$ to $C_{23}$ molecules; the base oil described above where the oil contains less than 1.00% by volume of $C_{11}$ or fewer carbon atoms per molecule; the base oil described above where the oil contains less than 5.00% by volume of $C_{25}$ or greater carbon atoms per molecule; and the base oil described above where the oil has a mass density of less than 850 kg/m$^3$ at 15° C.

A method of drilling a well is also described including pumping invert drilling mud down a drill string through a drill bit to facilitate the drilling of the well, wherein the invert drilling mud used is recovered and recycled from drilling waste containing an oil phase, by contacting the drilling waste containing an oil phase with a solvent to produce a liquids phase and a solids phase, separating the two phases, processing the liquids phase to produce an oil base composition substantially lacking low molecular weight carbon chain compounds and substantially lacking significant concentrations of benzene, toluene, xylene, and/or ethyl benzene, and having increased closed-cup flashpoint compared to the oil phase, resulting in enhanced health and safety characteristics for workers interacting with and otherwise exposed to the oil base composition during transporting, conditioning or using such compositions.

Additional embodiments include: the method described above where the recovered drilling mud includes more than 0.5% by volume water and less than 5% by volume of at least one drilling mud additive comprising weighting agents, fluid loss additives, shale stabilizers, pH adjusters, viscosity adjustment agents, emulsifiers, salts, wetting agents or dispersants; the method described above where the recovery process is carried out in a gas-tight environment; the method described above where the drilling waste is from one or more drilling waste generators; the method described above where the drilling waste is contaminated with at least a portion of oil base drilling fluid; the method described above where contacting comprises washing the drilling waste with a solvent containing up to nine carbon atoms in each solvent molecule; the method described above including using less than 4,000 MJ of combined electrical and combustion gas energy per cubic metre of produced base oil; the method described above where the produced base oil has a closed cup flash point of greater than 61° C.; the method described above where the produced base oil has a closed cup flash point of greater than 93° C.; the method described above where the produced base oil has a closed cup flash point of greater than 100° C.; the method described above where the produced base oil has a combined total benzene, toluene, xylene, and ethyl benzene content of less than 0.0005 volume fraction; the method described above where the produced base oil has a combined total benzene, toluene, xylene, and ethyl benzene content of less than 0.00005 volume fraction; the method described above where the produced base oil comprises an aniline point of greater than 65° C.; the method described above where the produced base oil comprises an aniline point of greater than 70° C.; the method described above where the produced base oil contains at least 90.00% by volume of $C_{11}$ to $C_{25}$ molecules; the method described above where the produced base oil contains at least 90.00% by volume of $C_{14}$ to $C_{25}$ molecules; the method described above where the produced base oil contains at least 90.00% by volume of $C_{14}$ to $C_{23}$ molecules; the method described above where the produced base oil contains less than 1.00% by volume of $C_{11}$ or fewer carbon atoms per molecule; the method described above where the produced base oil contains less than 5.00% by volume of $C_{25}$ or greater carbon atoms per molecule; and the method described above where the produced base oil has a mass density of less than 850 kg/m$^3$ at 15° C.

DETAILED DESCRIPTION

Figure 1:
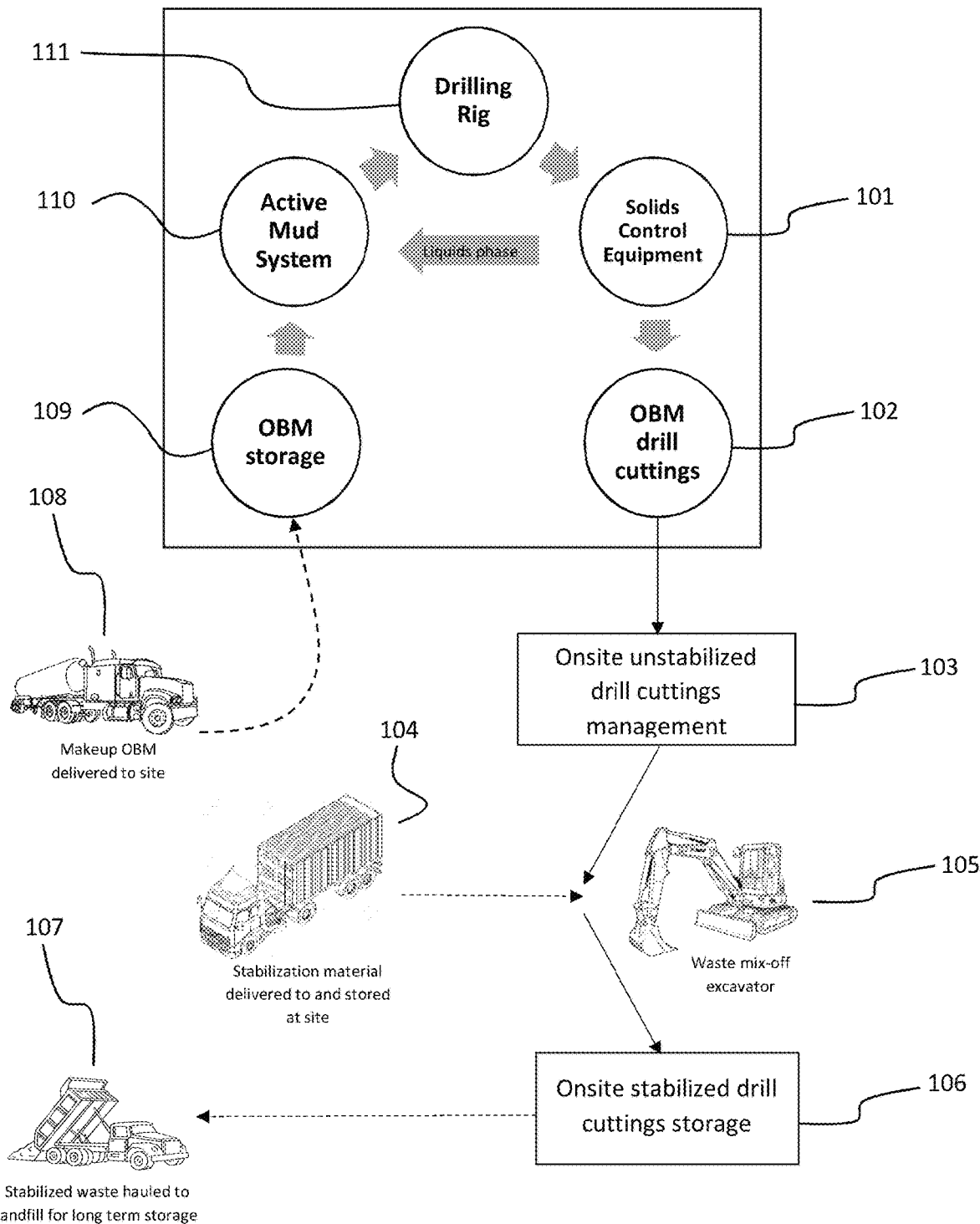
FIG. 1 demonstrates a typical on site drilling rig fluids and solids management operation.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Terminology

The following paragraphs describe terminology used herein included for ease of understanding.

Low Gravity Solids (LGS) are generally known as solids that are less than fifty microns in size. Low micron solids can include high or low gravity solids, which are typically (albeit arbitrarily) separated by a specific gravity (SG) of 3.0 in the drilling industry. For example, high gravity solids are weighting agents like barite or hematite, both of which are heavier than 3.0 SG. Drilled solids and drilling fluid additives, for example, bentone, lime, or lignite are lighter than 3.0 SG.

Base Oil is the backbone of an invert drilling fluid and generally defined as either a distillate or synthetic. Synthetic base oils are typically 25% to 50% more expensive than distillates because additional refining is completed with synthetics, which causes the hydrocarbon chain to be tighter, as opposed to including more lighter-end or heavier-end fractions. The base oil is the hydrocarbon substance that provides the foundation on which to build a useful invert drilling fluid.

Oil-Base Mud (OBM) or Invert comprises base oil and water in a water-in-oil emulsion, or oil-in-water emulsion and necessary additives which form the actual drilling fluid. The make-up of an OBM is often modified continuously to maximize its' usefulness during the drilling of a well. As the drill bit penetrates deeper through various formations, additives may be added to preferentially enhance desired mud properties, for example, yield strength or gel strength, resulting in a higher rate of penetration or better hole stability.

Viscosity is best understood as the thickness of a fluid. For example, water has relatively low viscosity, whereas a milkshake has a higher viscosity.

Yield Strength is an important characteristic related to the 'carrying capacity' of a drilling fluid. A marble dropped in a bottle of water demonstrates a fluid with a very low yield, because the marble drops without stirring the water. The same marble dropped in a bottle of ketchup will not drop through the fluid without a significant amount of stirring or agitation to break the yield strength of the ketchup. If an object is heavy enough to exceed the yield point of the fluid, it will drop more slowly than the same size solid in water due to the higher viscosity of the ketchup.

BTEX is the collective acronym for the compounds benzene, toluene, ethyl benzene and three isomers of xylene. They are found in many compounds in the oil and gas upstream industries, and in the petrochemical industries. BTEX is a volatile group of substances and harmful to human health. They are known carcinogens, with benzene being the most toxic substance present.

Binary distillation refers to fractionation of a feed stream into only two product streams. This type of distillation is simpler than other conventional types of fractionation where a feed stream is separated into several product streams using different boiling point ranges to achieve that separation.

In recent years, efforts have been made to overcome one of the largest problems in the field of drilling waste management, the disposal of stabilized drill cuttings, which still contain appreciable amounts of hydrocarbons, inorganic chemicals, and other potentially environmentally harmful substances. In most regulatory jurisdictions, disposal of drilling waste in hazardous waste landfills does not indemnify the original waste producer of any legal liability in the event of an environmental spill. Liability for clean-up costs following an environmental spill of drill cuttings waste may ultimately be traced back to the original waste producer. While every effort is made by landfill operators to prevent any harmful leachate breaching the containment liner, the possibility still exists, which represents a business risk to the waste generators.

The current practice for onsite drilling waste management is to mechanically separate drill cuttings from drilling mud by means of shale shakers, centrifuges, or similar devices at the drill site. The recovered drilling mud is recycled back to the drilling operation. The 'waste' drill cuttings are stabilized with a bulking agent, such as sawdust or fly-ash before being transported to a secure landfill.

A typical process flow schematic for drilling waste is illustrated in FIG. 1. Drill cuttings (102) (from the shale shaker or other solids control equipment (101)) and low gravity solids underflow (as shown also contained in 101) (from the onsite decanter) are typically collected at the drill site in an onsite unstabilized drill cuttings management systems (103) (such as a three or four sided bins) and mixed with a stabilizing agent, for example sawdust or liquids absorbing pellets, and delivered to and/or stored at the site (104), to absorb the free leachable fluids. The mix off is typically done by means of a wheeled loader or track excavator (105). The stabilized drill cuttings waste can then be transported safely using conventional transport methods, such as sealed end dump trailers. The stabilized drill cuttings waste is stored (106) and transported (107) to specially designed landfills featuring leachate collection systems and impervious liners. Landfills are built for long term storage. Makeup base oil or OBM is transported (108) to the site to cover the OBM losses resulting from the mix off process. The OBM is stored at the site (109) for use in the active mud system (110) of the drilling rig (111).

Over the years, improvements have been made to drill site cuttings separation equipment in order to reduce waste volumes sent to landfill. Simple shale shakers have evolved to improve separation efficiency. Canadian Patent Nos. 2,741,955; 2,712,774 and 2,793,233 collaboratively describe processes whereby vacuum and/or pressure are applied to the under or upper side respectively of the shaker screens to improve separation efficiency. Other types of separation equipment, such as decanter centrifuges now routinely complement the shale shakers to further improve the recovery of invert from contaminated drill cuttings, thereby reducing the amount of contaminated waste sent for disposal.

Other attempts have been made to reduce the eco-toxicity of the contaminated waste, by replacing the base oil with a composition less damaging to the environment. One such example of an improvement in this area is provided in U.S. Pat. No. 5,189,012 whereby a synthetic hydrocarbon base oil is proposed which is essentially non-polluting and minimally toxic to marine life. The synthetic oil is composed of branched chain oligomers synthesized from one or more polymerizable olefinic monomers of relatively uniform carbon chain length units varying from $C_2$ to $C_{12}$. This compares favorably with conventional base oils produced from petroleum crude oil which have a large variety of hydrocarbon compounds including aromatics and straight chain paraffins. U.S. Pat. No. 7,547,663 illustrates how an ester and isomerized olefin blend make an improvement drilling fluid base from an environmental perspective. These inventions, and others like it, show combinations of reduced toxicity to marine life, and by inference to humans, improved environmental biodegradability, and acceptable drilling mud performance in those cases tested. However, one observed disadvantage is they cannot always offer the ideal rheological or emulsion properties of a conventional base oil. More additives must be added to compensate for an under-performing base oil, such as viscosifiers, emulsifiers, wetting agents, weighting agents etc., that are themselves potentially toxic and harmful to the environment.

The approach described herein addresses the issue of drilling waste management from another angle. The product produced is a product of a process that treats drill cuttings not as a waste, but rather as a feedstock to generate a drilling fluid base oil of superior properties to said feedstock. Using this approach, most of the base oil present in the drill cuttings can be diverted away from landfills, which reduces or eliminates liability resulting from environmentally harmful effects of the original base oil. In addition, the produced base oil is an improvement on the hydrocarbon base present in the feedstock. It should be recognized that any base oil with reduced concentrations of BTEX, and especially benzene, would result in reduced worker exposure to carcinogenic substances, thereby improving worker safety. In general, lighter hydrocarbon components within a substance increase its volatility, and therefore increase its flammability. It should also be recognized that a base oil with a reduced concentration of lower molecular weight carbon chains would have a lower flammability, and thereby a higher flashpoint, thus being a safer material to handle than conventional base oils.

Reclaiming materials from drilling waste, such as various components of the drilling fluids, is clearly advantageous. Beyond simply recovering useful drilling fluids from drilling waste, a process to recover and refine drilling fluids further to yield a product with improved characteristics is even more advantageous. A base oil having any of the following characteristics such as improved drilling performance leading to reduced drilling costs, more inherently safe for rig workers, and/or production process with a lower environmental footprint, clearly represents a significant improvement in this area. The resulting oil is a refined product re-useable as a drilling fluid base oil.

A more detailed description and characterization of a recovered base oil for re-use as a constituent of a drilling fluid follows herein. The refined oil has improved features when compared to commercially available base oils, that reduce the material toxicity, lower the overall product flammability, all while consuming less energy than conventional base oil production technologies. The produced base oil will be re-used in drilling fluids instead of being sent to landfill for disposal, as is the current state of the art. The composition is also produced utilizing a process demonstrating a lower energy requirement than conventional base oil primary production techniques. The process also uses a drill cuttings waste stream as feedstock. The waste stream would otherwise be stabilized with a bulking agent and sent to landfill for final disposal under the current state of the art. Through the recycling of an unstabilized waste stream into a useful product, this process contributes to a more environmentally sustainable solution to drilling waste handling.

In particular, the drilling fluid is comprised of an organic phase of composition:

i. Greater than 95.00 volume (vol) %, preferably greater than 97.00 vol %, preferably greater than 99.00% vol %, more preferably greater than 99.90 vol %, based on the total volume of components i. and ii., of at least one linear or branched, cyclic or non-cyclic, hydrocarbon;

ii. from about 3.00 vol % to 5.00% vol %, preferable less than 3.00 vol %, preferably less than 1.00 vol %, even more preferably less than 0.10 vol %, based on the total volume of components i. and ii., of at least one additive selected from the group consisting of, but not limited to, weighting agents, fluid loss additives, shale stabilizers, pH adjusters, viscosity adjustment agents, emulsifiers, salts, wetting agents, and dispersants.

The National Fire Prevention Association classifies combustibility and flammability of liquids based primarily on flash point (further illustrated in Table 1 below).

TABLE 1

(NFPA 30 Liquids Flammability Classification)

|  | Flash Point | Boiling Point |  |
|---|---|---|---|
| Class IA | <22.8° C. | <37.8° C. | Flammable |
| Class IB | <22.8° C. | >37.8° C. |  |
| Class IC | >22.8° C. | <37.8° C. |  |
| Class II | 37.8° C. to 60° C. | n/a | Combustible |
| Class IIIA | 60° C. to 93° C. | n/a |  |
| Class IIIB | >93° C. | n/a |  |

The Canadian Oil and Gas Industry broadly aligns with the NFPA system for flash point classification. Industry Recommended Practice 14 (IRP 14): Non-Water Base Drilling Fluid declares the additional flash point threshold of 61° C., below which a fully enclosed gas-tight system is required.

The recycled base oil described herein preferably has at least one, more preferably at least two of the following properties:

i. a flash point greater than 61° C., preferably in the range of about 75° C. to about 150° C., more preferably in the range of 93° C. to about 150° C., and yet more preferably in the range of about 100° C. to about 150° C.

ii. a vapour pressure (corrected to 20° C.) of less than 0 Torr gauge.

Table 2 shows a typical carbon chain assay, as determined by gas chromatograph analysis, of both a commercially available base oil, and an embodiment of the refined base oil described herein.

TABLE 2

(Aliphatic Hydrocarbon Chemical Composition of Two Base Oils)

| Component | Conventional Base Oil | Recovered Base Oil (by solvent extraction) |
|---|---|---|
|  | Normalized Volume Fraction | |
| C1 | 0.00000 | 0.00000 |
| C2 | 0.00000 | 0.00000 |
| C3 | 0.00000 | 0.00000 |
| C4 | 0.00000 | 0.00000 |

TABLE 2-continued (Aliphatic Hydrocarbon Chemical Composition of Two Base Oils)

| Component | Conventional Base Oil | Recovered Base Oil (by solvent extraction) |
|---|---|---|
|  | Normalized Volume Fraction | |
| C5 | 0.00000 | 0.00000 |
| C6 | 0.01000 | 0.00000 |
| C7 | 0.00001 | 0.00000 |
| C8 | 0.00004 | 0.00000 |
| C9 | 0.00050 | 0.00000 |
| C10 | 0.00070 | 0.00000 |
| C11 | 0.00800 | 0.00000 |
| C12 | 0.00900 | 0.00030 |
| C13 | 0.01600 | 0.00300 |
| C14 | 0.01400 | 0.00428 |
| C15 | 0.03600 | 0.01362 |
| C16 | 0.04300 | 0.03092 |
| C17 | 0.07800 | 0.05000 |
| C18 | 0.08000 | 0.16000 |
| C19 | 0.11000 | 0.20000 |
| C20 | 0.13000 | 0.18000 |
| C21 | 0.11000 | 0.14000 |
| C22 | 0.10000 | 0.09000 |
| C23 | 0.08000 | 0.06000 |
| C24 | 0.06000 | 0.02500 |
| C25 | 0.04500 | 0.01500 |
| C26 | 0.03000 | 0.00800 |
| C27 | 0.02500 | 0.00500 |
| C28 | 0.00700 | 0.00400 |
| C29 | 0.00500 | 0.00100 |
| C30+ | 0.00600 | 0.01000 |

Table 2 characterizes the hydrocarbon chain distribution of the described refined base oil and compares it to a typical commercially available base oil. It serves to highlight that the refined base oil has a narrower carbon chain distribution with fewer 'light ends' containing $C_{10}$ and less. Through the drill cuttings treatment process, the skeletal make-up of the base oil is altered to form a base oil offering a tighter carbon distribution. Some of the lowest molecular weight components have been stripped from the oil. The resulting composition of matter has a lower volatility, and hence lower flammability than conventional base oil from primary production techniques, making it clearly safer from a fire prevention perspective.

Figure 2:
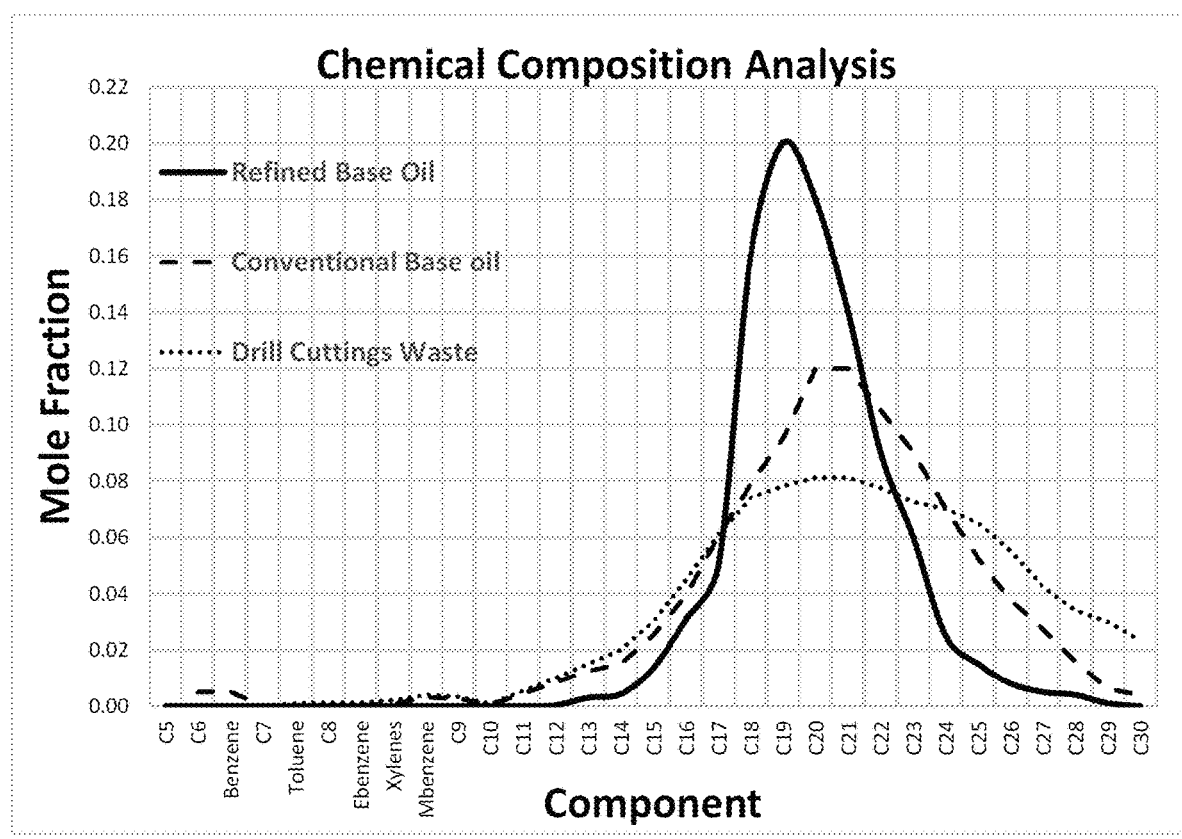
FIG. 2 shows a schematic of a boiling point analysis of a typical conventional base oil and the refined base oil described herein.

FIG. 2 shows a schematic of a normalized and smoothed crude boiling point analysis of a typical (conventional) distillate base oil, the refined synthetic-like base oil described herein, and the unstabilized drill cuttings waste stream leaving the rig site. It reinforces the improved characteristics of the refined base oil when compared to a conventional base oil. The base oil is altered by the enhanced recovery process into a tighter carbon chain distribution more closely resembling that of a synthetic oil. The refined base oil has fewer light ends than the conventional base oil, and also has less BTEX present, both of contribute to its reduced toxicity and oil flammability.

Table 3 shows a typical and non-limiting example of a base oil BTEX and aromatic hydrocarbon analysis, along with some other relevant physical property data (vol frac=volume fraction).

TABLE 3

(BTEX content of distillate and synthetic base oils)

|  | Carbon Number | Boiling Point Range (° C.) | Conventional (distillate) Base Oil | Refined (synthetic) Base Oil |
| --- | --- | --- | --- | --- |
| Benzene (vol frac) | C6 | 80.0 | 0.00025 | 0.00002 |
| Toluene (vol frac) | C7 | 110.6 | 0.00010 | 0.00001 |
| Ethyl Benzene (vol frac) | C8 | 136.2 | 0.00010 | 0.00001 |
| Xylenes (vol frac) | C8 | 138.4-144.4 | 0.00010 | 0.00001. |
| Total BTEX (vol frac) |  |  | 0.00055 | 0.00005 |
| Flash Point (° C.) | — | — | >93 | >100 |
| Mass Density (kg/m$^3$) | — | — | 850-900 | 800-850 |
| Aniline Point (° C.) | — | — | 63 | 71 |

While light-end molecules ($C_{10}$ and lower) impact the flashpoint of synthetic base oil negatively, of particular concern is BTEX concentration. BTEX present in the base oil acts to not only lower the flashpoint, but also increases the oil toxicity, and has a higher tendency to degrade elastomeric components within drilling rig equipment. Table 3 further illustrates that the refined base oil has a reduced concentration of BTEX. This is further supported by the higher aniline point, which indicates a lower concentration of aromatics. Also, since BTEX are relatively volatile components in a typical base oil, a higher flash point further indicates a reduced concentration of BTEX constituents. Through the drill cuttings treatment process, the skeletal make-up of the base oil has been altered by removing some of the BTEX present in the feedstock, and more generally, $C_{10}$ or smaller carbon chains. Therefore, the composition of matter has a reduced toxicity to humans and represents an improvement in overall worker safety.

Furthermore, since the refined base oil has a reduced concentration of BTEX, it demonstrates improved characteristics with respect to elastomer degradation, for example, it will degrade elastomers and polymers less than a conventional base oil with a higher concentration of BTEX. This characteristic will lead to a longer service life of those drilling rig components that use elastomers. It will tend to reduce the frequency of failure of elastomer components in contact with drilling fluid. This can clearly be seen as a benefit, especially when considering drilling rig safety critical components, for example, blowout preventers, pump seals and gaskets et al.

The refined base oil is produced by way of a drill cuttings recovery process. Commonly owned U.S. Patent Application Ser. Nos. 62/303,163; 62/303,169; 62/303,172 and 62/416,952 herein incorporated in their entirety by reference, disclose methods of mixing a miscible diluent with unstabilized drill cuttings to allow the diluent to dissolve in the contaminant, thereby altering the rheology of the hydrocarbon contaminant. The washing mechanism permits additional solid phase-liquid phase interaction moments as the solids phase and liquids phase are separated. The liquid phase mixture is moved to one or more fluids rehabilitation processes where the diluent is at least partially evaporated, condensed, and re-used in the wash process, and the oil phase is reused as a drilling fluid base. The solids phase mixture is moved to an operatively connected process for residual solvent extraction, for example, a solids dryer.

Figure 3:
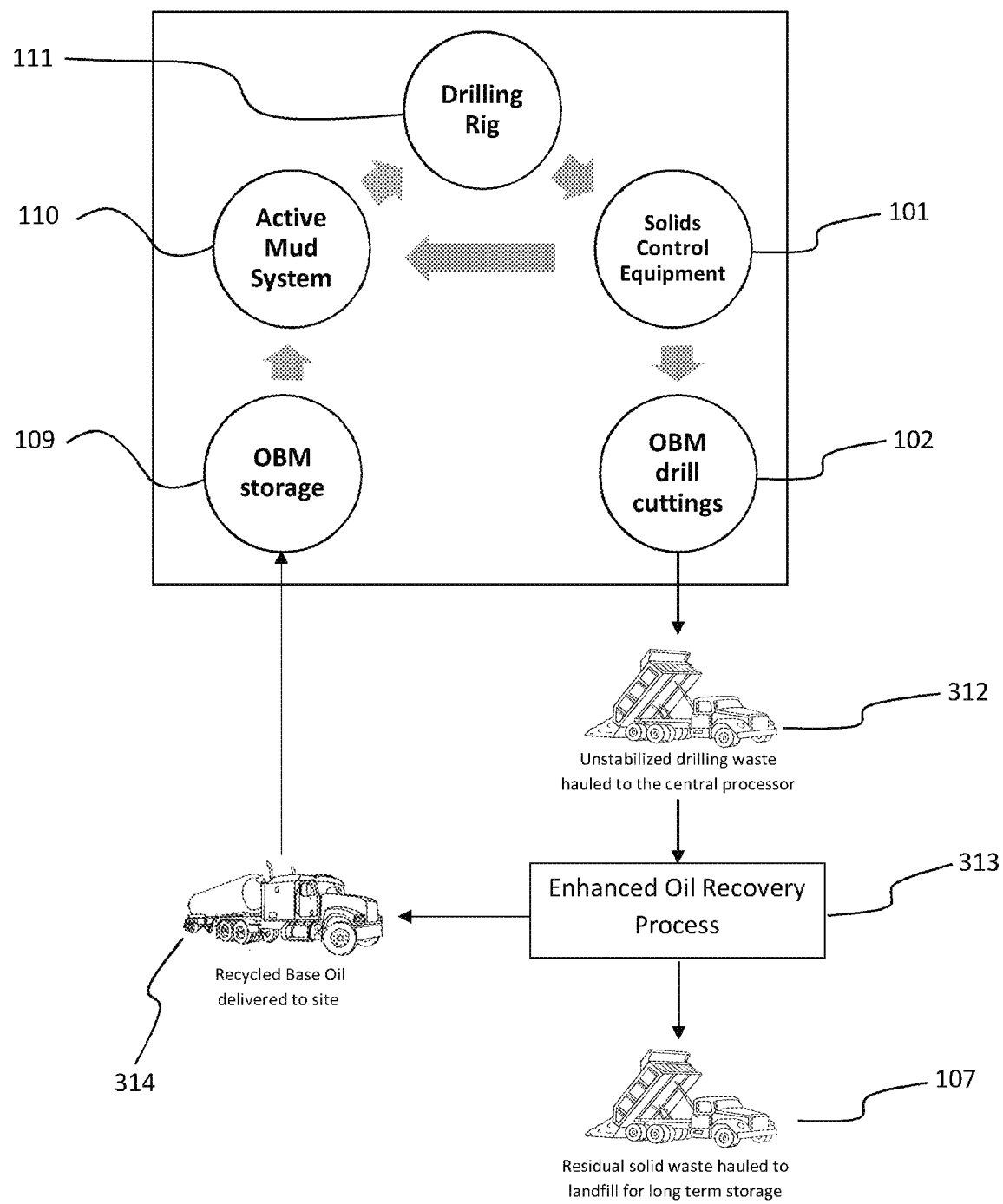
FIG. 3 demonstrates an on-site drilling rig fluids and solids management operation that uses refined base oil from an enhanced oil recovery process.

FIG. 3 illustrates how the process flow diagram for enhanced recovery of improved base oil would alter a typical process flow schematic. Unstabilized OBM drill cuttings (102) are transported (312) from the drill site to a central processing facility for enhanced base oil recovery (313). The improved base oil produced is transported (314) to the same or other drilling operations to OBM storage (109). The solid waste generated is hauled to landfill for long term storage (107). Total volumes sent for landfill disposal are significantly reduced.

Figure 4:
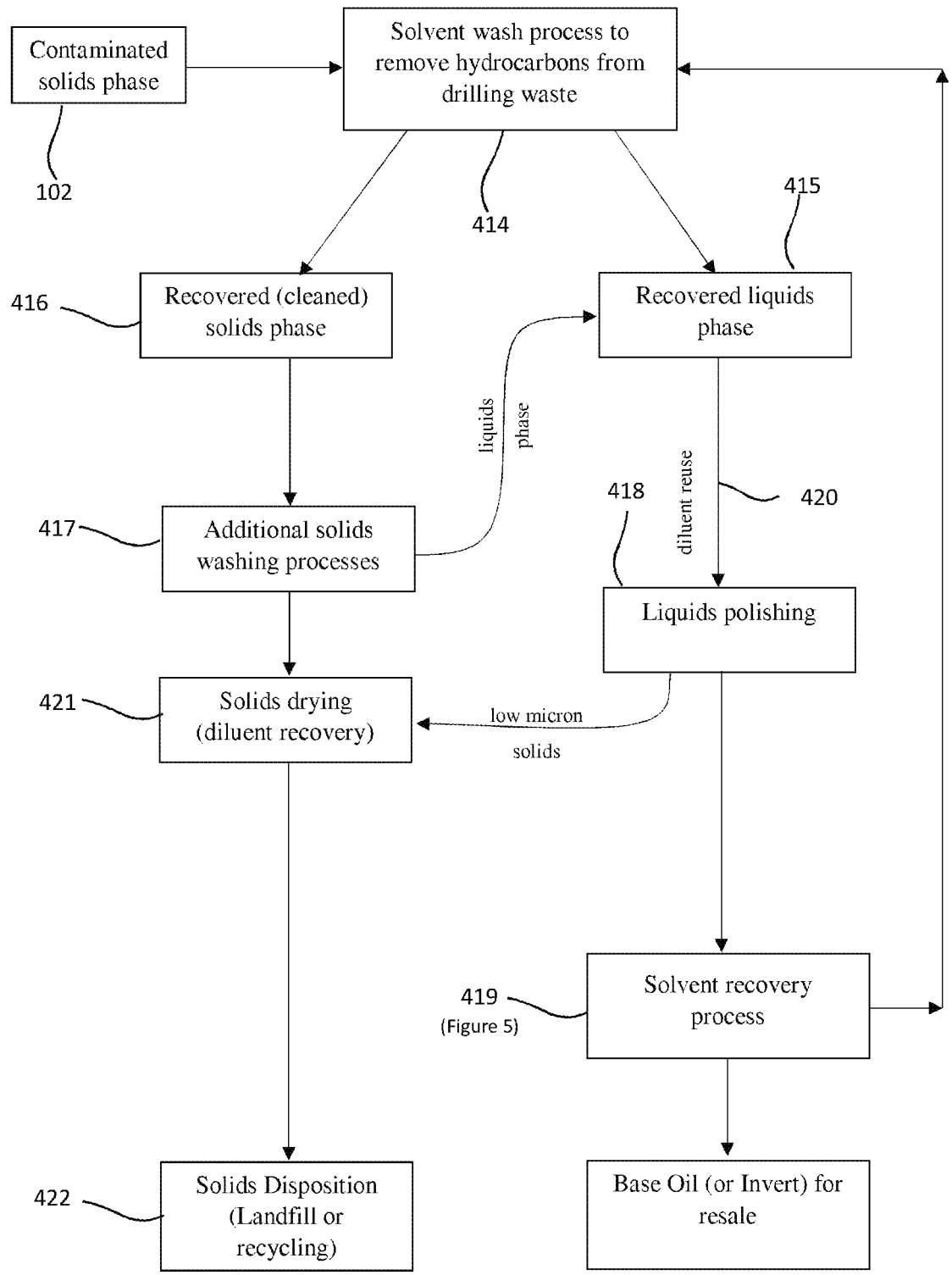
FIG. 4 is a flow chart demonstrating a process layout useful with an embodiment described within.

FIG. 4 shows an exemplary simplified flow schematic for the process by which the base oil is re-manufactured. The unstabilized drill cuttings feed (102) is first conveyed from an atmospheric tank to a gas tight solvent wash process (414). An embodiment of such a wash system can use a gas tight wash tank, but those skilled in the art would recognize it could include any number of equipment types, such as a gas tight decanter centrifuge, gas tight mechanical separator, clarifier etc. The cleaned solids (416) can be sent to additional wash processes (417) before being dried (422) and ultimately recycled, or discarded to a final disposition (422). Liquids recovered from solvent wash process (415) are sent for further liquids recovery in additional polishing stages (418). One embodiment of such a polishing process may use decanter centrifuges for solids removal, but again those skilled in the art would recognize that other equipment types could be used, for example, a Lamella inclined plate clarifier, or settling tank, or disc-centrifuge, or filtration bank. The low micron solids removed from the polishing stage are sent for drying (421), while the solvent present in the recovered polished liquids phase is recovered in a solvent recovery apparatus (419), suitable for separation of a binary solvent/OBM fluid mixture. Those skilled in the art will recognize that a tertiary distillation system, or vacuum kettles may also be used to recover the solvent while simultaneously removing undesired volatiles from the re-manufactured base oil.

Figure 5:
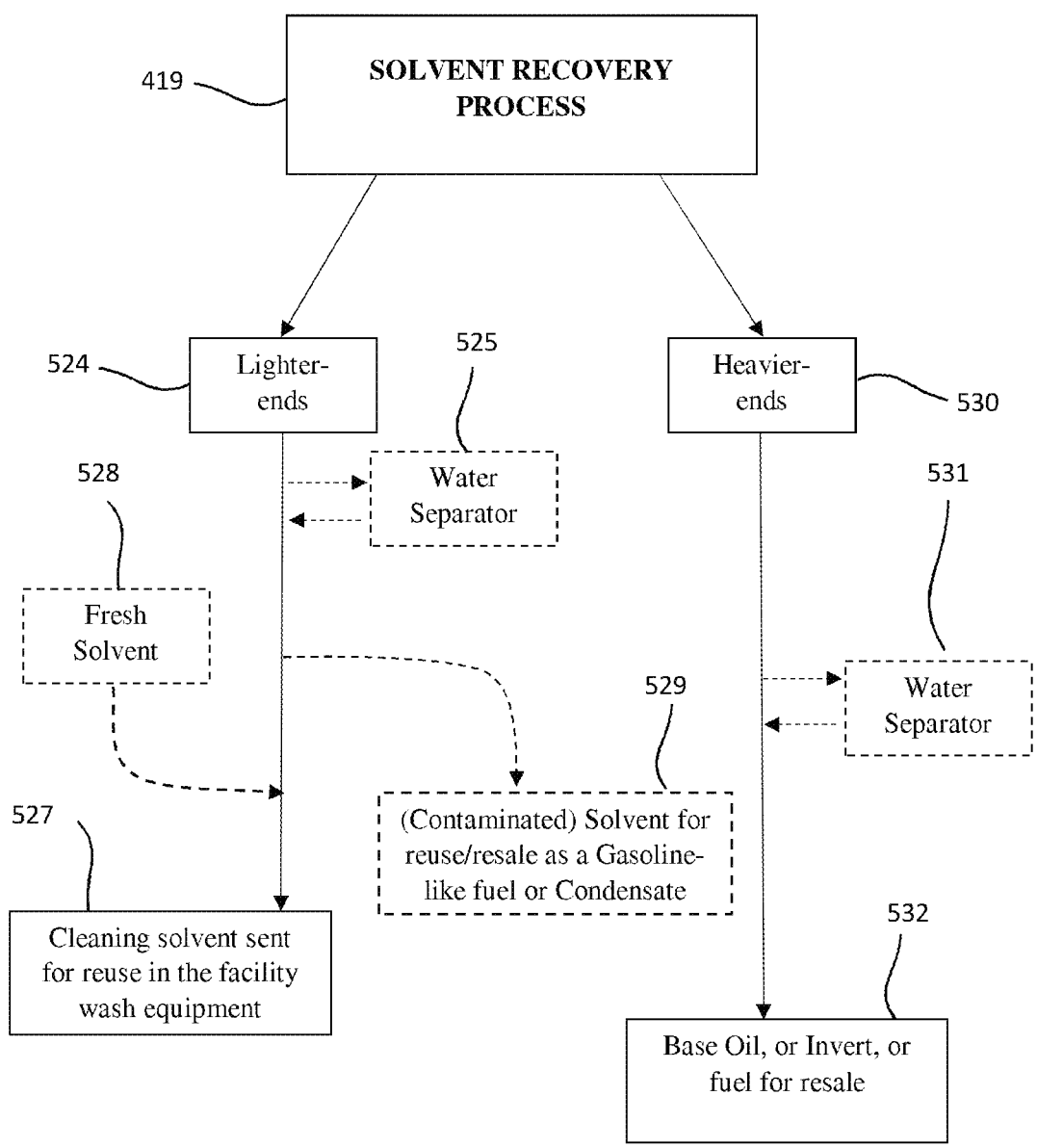
FIG. 5 is a flow chart demonstrating a solvent recovery process in more detail, useful with an embodiment described within.

Said lighter-ends are better described in commonly assigned, co-pending patent U.S. patent application Ser. No. 15/981,576 entitled Solvent Blend Processes and Products, filed of even date herewith, the disclosure of which is herein incorporated by reference in its entirely, consist largely of the desired solvent which is reused (420) within the solids wash (and/or mechanical separation) process (414) designed to separate base oil from drill cuttings. Over time however, accumulations of undesired volatiles and water will cause the solvent to become less effective as a cleaning solvent, or cause the cleaned solids to become re-contaminated with higher levels of undesired volatiles. FIG. 5 is a process flow diagram to illustrate the methods of refreshing the cleaning solvent (524). The water phase can be removed from the recovered solvent by employing a coalescing filter, or membrane filter, or phase separation tank (525) so that the water phase can be sent for suitable disposition. If the recovered solvent becomes contaminated with undesired volatiles, then a portion of the recovered solvent (529) will be replaced with fresh solvent (528), to return the cleaning solvent (527) to the desired purity, as determined by the operator of the drilling waste processing facility (313) for being most effective at cleaning drilling waste (102). The portion of solvent otherwise contaminated (529) and therefore removed from the process can be reused as a gasoline-like fuel source, or marketed and sold in a similar fashion as that of produced condensate.

Said heavier molecular weight hydrocarbon is the better quality oil phase (530) recovered from the solvent recovery process, which is sent to storage for resale, to be re-used in a drilling fluid, or used as a fuel source, or a combination of both. While it is possible for at least a portion of water to accumulate in the oil phase, it is expected that the water phase can be removed with little effort by employing [a coalescing filter, or membrane filter, or phase separation tank] (531), or chemically aided by adding a de-emulsifier. However, given oil base drilling fluids consist of an emulsion, the presence of water will not substantially impact the resale value or perceived quality of the recovered oil phase (532) when reused as a drilling fluid.

The recovery process is substantially more energy efficient than those methods currently used to produce commercially available base oils. The recovery process uses a simple binary distillation to separate the lighter-ends from heavier molecular weight hydrocarbons, consuming less energy per unit volume of recovered refined base oil than conventional refinery processes.

Commercially available base oils are produced from paraffinic (straight chain) and naphthenic (cyclic) crude oils in refining trains typically consisting of some combination of the following processing units: de-waxing, distillation, hydrocracking, solvent extraction, hydrogenation. Clearly a process designed to isolate many different fractions of a continuous boiling point range product will consume more energy than a binary distillation process aimed at isolating only two fractions of a mixture, as is the case here. Since the feed is being refined into only two products (base oil and solvent), the relative energy intensity is significantly lower than a traditional multi-product refinery. Also, the process uses distillation as the only oil refinement process (excluding the low energy primary mechanical separation step), and does not employ other more energy intensive processes such as hydrocracking.

In one embodiment of a base oil recovery process described herein, the total combined electrical and combustion gas energy requirement for operation of the process equipment does not exceed 4,000 MJ (megajoule) per cubic metre of refined base oil product.

The base oil is a product of a process to recover base oil from the 'unstabilized' drill cuttings. What was previously described as a waste stream, is "up-cycled" via the recovery process into a more useful base oil for use as a drilling fluid or fuel. The process diverts a significant portion of an otherwise landfilled waste stream, back to the drilling operation. Furthermore, no bulking agent is required, reducing the overall disposal to landfill volumes still further. The base oil and its production process yield a significant environmental benefit with respect to volumes of contaminated waste being sent to landfill. This has an added benefit in some jurisdictions, where the ultimate legal liability for any negative environmental consequences resulting from a landfill leachate remain with the original polluter. It is clear that a significantly reduced volume or mass being disposed of at landfill would represent a proportionately reduced legal liability, not to mention a benefit to the environment as a whole.

As described herein, these problems and others in this area are addressed with the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for producing a base oil composition particularly adapted for use in oil-base drilling mud compositions comprising:
    contacting drilling waste containing an oil-base mud phase with a liquid solvent to produce a mixture containing liquids and solids;
    separating the two phases to produce a solid phase substantially lacking in a liquids phase, and a liquids phase substantially lacking in a solids phase, and
    evaporating at least some portion of the components of the liquids phase to remove low molecular weight carbon chain compounds as well as benzene, toluene, xylene, and/or ethyl benzene thereby producing a base oil composition substantially lacking low molecular weight carbon chain compounds and substantially lacking benzene, toluene, xylene, and/or ethyl benzene, and having increased closed-cup flashpoint compared to the oil phase,
    wherein the process is carried out in a gas-tight, substantially oxygen deficient environment,
    resulting in reduced exposure to low molecular weight carbon chain compounds and benzene, toluene, xylene, and/or ethyl benzene for workers interacting with and otherwise exposed to the base oil composition during transporting, conditioning or using such compositions.

2. The process of claim 1, wherein contacting comprises washing the drilling waste with a solvent containing up to nine carbon atoms in each solvent molecule.

3. The process of claim 1, wherein the produced base oil has a closed cup flash point of greater than 61° C.

4. The process of claim 1, wherein the produced base oil comprises an aniline point of greater than 65° C.

5. The process of claim 1, wherein the produced base oil contains at least 90.00% by volume of $C_{11}$ to $C_{25}$ molecules.

6. The process of claim 1, wherein the produced base oil has a mass density of less than 850 kg/m³ at 15° C.

* * * * *